(12) United States Patent
Hiroki

(10) Patent No.: US 7,496,502 B2
(45) Date of Patent: Feb. 24, 2009

(54) INFORMATION PROVIDING SYSTEM AND METHOD THEREFOR

(75) Inventor: Masaaki Hiroki, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 569 days.

(21) Appl. No.: 09/880,986

(22) Filed: Jun. 13, 2001

(65) Prior Publication Data

US 2002/0023146 A1 Feb. 21, 2002

(30) Foreign Application Priority Data

Jun. 16, 2000 (JP) ............................. 2000-181595

(51) Int. Cl.
*G10L 11/00* (2006.01)
(52) U.S. Cl. ...................... 704/200; 704/270; 704/7; 707/10; 707/9
(58) Field of Classification Search ................. 704/257, 704/200, 7, 270, 274, 270.1; 707/5, 9, 10; 713/176; 709/217; 701/48, 200; 455/466, 455/450
See application file for complete search history.

(56) References Cited

U.S. PATENT DOCUMENTS

| | | | | |
|---|---|---|---|---|
| 5,838,790 | A * | 11/1998 | McAuliffe et al. | 713/176 |
| 5,933,811 | A | 8/1999 | Angles et al. | |
| 5,933,822 | A * | 8/1999 | Braden-Harder et al. | 707/5 |
| 6,148,253 | A * | 11/2000 | Taguchi et al. | 701/48 |
| 6,151,624 | A * | 11/2000 | Teare et al. | 709/217 |
| 6,516,316 | B1 * | 2/2003 | Ramasubramani et al. | 707/9 |
| 6,606,481 | B1 | 8/2003 | Tegler et al. | |
| 6,607,136 | B1 | 8/2003 | Atsmon et al. | |
| 6,615,172 | B1 * | 9/2003 | Bennett et al. | 704/257 |
| 7,010,312 | B1 * | 3/2006 | Zechlin | 455/466 |
| 2004/0031856 | A1 | 2/2004 | Atsmon et al. | |

FOREIGN PATENT DOCUMENTS

| | | |
|---|---|---|
| EP | 0 971 327 | 1/2000 |
| EP | 1 175 069 A1 | 1/2002 |
| WO | WO 98/24050 | 6/1998 |
| WO | WO 98/56181 | 12/1998 |
| WO | WO 00/21020 | 4/2000 |

OTHER PUBLICATIONS

Search Report (Application No. 06014864.0), dated Sep. 6, 2006, 5 pages.
Office Action (European Patent Application No. 06 014 864.0) mailed Feb. 19, 2008, 5 pages.
EPO Communication dated Mar. 10, 2004 including a Partial European Search Report.
European Search Report, Apr. 19, 2004, 5 pages.

* cited by examiner

Primary Examiner—Huyen X. Vo
(74) Attorney, Agent, or Firm—Fish & Richardson P.C.

(57) ABSTRACT

Upon attempting to display information consisting of large amounts of data on a display portion of a portable terminal, there existed a problem that long durations of time were required for completion of the display, and display capacities were insufficient. A search signal is sent from a portable information equipment to a server, and the server conducts a search on a database based on the search signal and sends information of the search to a display device such as a television or projector mounted at a place where an unspecified number of the general public are present such as a large-sized monitor in a hotel lobby, in a train station meeting room, or out on the street.

15 Claims, 5 Drawing Sheets

INFORMATION PROVIDING SYSTEM AND METHOD THEREFOR

BACKGROUND OF THE INVENTION

1. Field of the Invention

The present invention relates to a system for delivering a broad range of information including letters or characters, symbols, images, voice and the like.

2. Description of the Related Art

Systems have been developed for members of an information-providing network to use portable information equipment to receive information. As an example of this kind of services, a member of the service accesses a server using the portable information equipment via a communication line, and performs a procedure for obtaining selected information. Then, the server searches a database for information in accordance with the request of the service member, and sends the information to the portable information instrument via the line, with the result that the information displayed on a display portion of the portable information equipment can be obtained.

For example, a service member wanting to know what time a movie X starts connects to the server from the portable information equipment through a communication line, and inputs the signal (URL, search key words, etc.) used to obtain the selected information, and transmits the signal to the server. The server searches the database based on the signal, and sends the results to the portable information equipment. Thus, the service member was able to obtain letter or character information and information in the form of a still image as large as could be displayed on the display portion of the portable information equipment, for example, "movie title: XX, movie theater: YY, show time: ZZ".

However, according to the conventional method for displaying information on a display portion of a portable information equipment, the information could not be more than what could be displayed on a small display screen of the portable information equipment. Therefore, there was a limit to the amount of data (information) that the service member could obtain. For example, the service member was not able to obtain information by displaying a moving image on a display portion of a large such as a television.

Further, in the case when the display portion of the portable information equipment was used to try to obtain information with a large amount of data, there were problems in that a long duration of time was required to complete the display, the display power was insufficient, and information storage unit included in the portable information equipment had insufficient capacity so that all of the information could not be received.

SUMMARY OF THE INVENTION

In order to solve the above problems, according to the present invention, there is provided an information providing system which displays the conventionally displayed information using the display portion of the portable information equipment sent from the server to a display device such as one set up on a street and having characteristics of superior transmission speed and image resolution.

The information provision system is constructed such that a search signal is sent from the portable information equipment to the server. The server conducts a search based on the search signal and sends the search information to a display device such as a television or a projector disposed in a place where an unspecified number of the general public are present, such as a large-sized monitor in a hotel lobby, in a train station waiting room, or out on the street. The display device is an information provision system structured to display the information received.

Further, if one has a portable information equipment, it is not even necessary to entry to the information providing service in order to obtain the desired information displaying the information on the display devices. Furthermore, the information providing system is such that advertising can be performed by displaying information on the display device.

Note that, in this specification, keywords, numerals, symbols, sound and other various forms of signals inputted into the portable information equipment in order to obtain the information are referred to generically as a search signal.

The present invention is an information providing system using:

a server having a database; a portable information equipment capable of two-way communication with the server; and a display device for receiving information sent by the server, characterized in that:

the portable information equipment sends a search signal to the server;

the server conducts a search on the database based on the search signal and sends information obtained by the search to the display device; and the display device displays the information thereon.

Further, the present invention is an information providing system using:

a first server for obtaining information from a database managed by a second server;

a portable information equipment capable of two-way communication with the first server; and a display device for receiving information from the first server, characterized in that:

the portable information equipment sends a search signal to the first server;

the first server has means for communicating with the second server; sends the search signal to the second server and searches the database managed by the second server based on the search signal; receives information obtained by the search; and sends the information to the display device; and the display device displays the information thereon.

Further, the present invention is characterized in that the server has means for receiving a search signal sent from the portable information equipment, means for performing entity identification of the portable information equipment and the display device, means for conducting a search on the database based on the search signal, means for sending the information obtained by the search to the display device, and means for charging an information provision fee to the portable information equipment.

Further, the present invention is characterized in that the portable information equipment has means for performing signal input, means for sending the search signal to the server, means for performing processes for receiving information provision, and means for storing a program for performing the processes; and the portable information equipment sends entity identification information for the display device in order for the server to perform entity identification of the display device.

Further, the present invention is an information providing system characterized in that the display device has means for sending sound signal capable of identifying the entity; uses the portable information equipment to send the sound signal to the server; and the identification of the display device is performed through the sound signal.

Further, the present invention is an information providing system characterized in that the portable information equipment and the display device conduct communication of signals, with which the entity identification can be made, through electromagnetic waves, and the portable information equipment sends the entity identification information of the display device to the server.

Further, the present invention is an information providing system characterized in that the display device has means for storing information sent from the server.

Further, the present invention is an information providing system characterized in that the display device has means for sensing a search signal and electromagnetic signals other than the search signal, which are sent by the portable information equipment.

Further, the present invention is an information providing system characterized in that the display device receives the information sent from the server via a communication line.

Further, the present invention is an information providing system characterized in that the display device receives the information sent from the server via a satellite.

Further, the present invention is an information providing means characterized in that at a time when the server is not conducting the search based on the search signal and not sending information, the commercial advertisement and public service announcements are sent from the server to the display device as information and are displayed on the display device.

Further, the present invention is an information providing system characterized in that the server stores information for advertisement from a sponsor, and sends the information to a display device, for providing as information the advertisement to an unspecified number of the general public, whereby being capable of using the display device as a n advertising medium of the sponsor.

Further, the present invention is an information providing system characterized in that the server sends information of a numeral and a letter or character to the display device to display it thereon, and the portable information equipment sends the same information as the numeral or the letter or character displayed on the display device to the server, with the result that the server verifies the information as a search signal from the portable information equipment.

Further, the present invention is an information providing system characterized in that the portable information equipment sends, to the server, a search signal of the information and an identification signal of the display device for displaying the information; the server conducts a search for the entity identification and the information of the display device based on the signal sent from the portable information equipment; sends the information to the display device, and specifies the portable information equipment that has requested the information provision and charges the information provision fee thereto.

Further, the information providing system enables the server to conduct searches on the database based on search signals sent from the plurality of portable information equipment; sends a plurality of information to display devices; and enables the display device to simultaneously display the plurality of information on the display portion which is divided into a plurality of regions, or displays the plurality of information on the display portion while overlapping with each other, whereby being capable of simultaneously providing a plurality of different information.

Further, the information providing system is configured so that at a predetermined time or at a time when the server performs an operation, the display device can display one selected from delivered information including public-sector broadcasts, private-sector broadcasts, and current news, or can simultaneously display one of the above together with information obtained by the search on the database by the server.

DETAILED DESCRIPTION OF THE PREFERRED EMBODIMENTS

Embodiment 1

Figure 1:
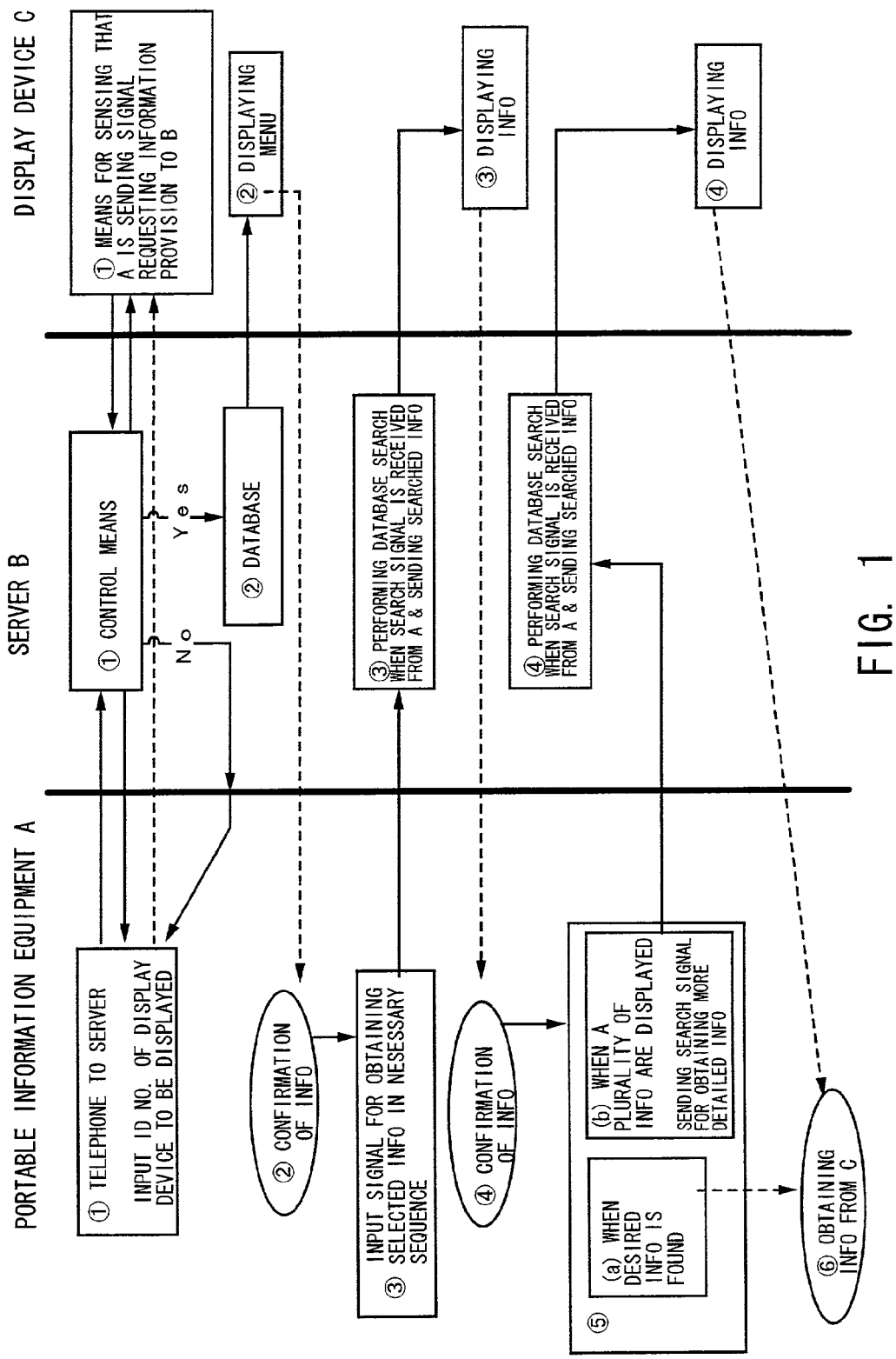
FIG. 1 is a diagram explaining the flow of an information providing system in accordance with the present invention.

By referring to FIG. 1, description will be made of a method using a portable information equipment A as means for performing a procedure to display information on a display device C disposed where an unspecified number of the general public are present (for example, a waiting room of a train station or an airport). FIG. 2 shows the structure of the present invention.

First, an access is established through a telephone number for requesting a provision of information to a server B from the portable information equipment A. Commonly known method for providing the information (for example, DialQ2 by NTT) may be used for procedures up to the point where the portable information equipment A receives the provision of information from the server B. When a user accesses the telephone number for information provision, the server B then indicates that the information provision will be charged. If a user continues to stay connected as he or she is, it is considered that consent has been given for the charge, and the information provision is performed.

Note that, however, in addition to the instance in which the user has knowledge about the information provision system (the telephone number for receiving information provision, etc.) before using the system, it is also possible to conceive of an instance in which a user uses the information provision system without any preliminary knowledge about the system at all.

Therefore, in order to increase the number of peoples using the information provision system, a special telephone number and method of use may be displayed on the display portion when electromagnetic waves sent from the portable information equipment A are sensed, or means for performing a call through a voice from a voice output portion may be provided to the display device. Accordingly, a greater number of people may take interest in the information provision system.

In order for the display device C to be individually identifiable when the server B transmits information, an ID number (number, symbol or name) distinguishable from other display devices is applied to the display device C. On the other hand, entity identification of the portable information equipment A can be performed based on, for example, the telephone number. As shown in FIGS. 1 and 2, in order for the server B to receive the information provision from the portable information equipment A, server B transmits a signal for individually identifying the portable information equipment A and for individually identifying the display device C (FIG. 1 portable information equipment A (1)).

Note, however, that in addition to performing entity identification of the display device C by directly inputting the ID number into the portable information equipment A and transmitting it to the server B, it is also possible to provide means for the display device C to send a known individually identifiable sound signal such as those used by Fax machines. In this case, the sound signal sent from the voice output portion is picked up at the portable information equipment A and notified to the server B, to perform the entity identification of the display device C.

Also, it is possible for the portable information equipment A and the display device C to an individually identifiable information exchange through electromagnetic waves such as light and infrared rays and by indicating the result of the exchange to the server B, to perform the entity identification of the display device C.

The display device C has a unit for detecting electromagnetic waves sent from the portable information equipment. The system is configured such that the response of the display device C detecting the electromagnetic waves sent from the portable information equipment A is transmitted to the server B. In this way, the information which needs to be verified in order to perform the information provision is sent to the server B from the portable information equipment A and from the display device C (FIG. 1 server B (1)).

It is also possible to configure the method so that the server B displays some numeral and letter or information on the display device C and the user inputs and transmits the same numeral that was displayed on the screen or inputs a response to information obtained from the display. In this way, the system can verify that the person who wants to have information displayed on the display device C is actually in a position where the information displayed on the display device C can be viewed.

Figure 2:
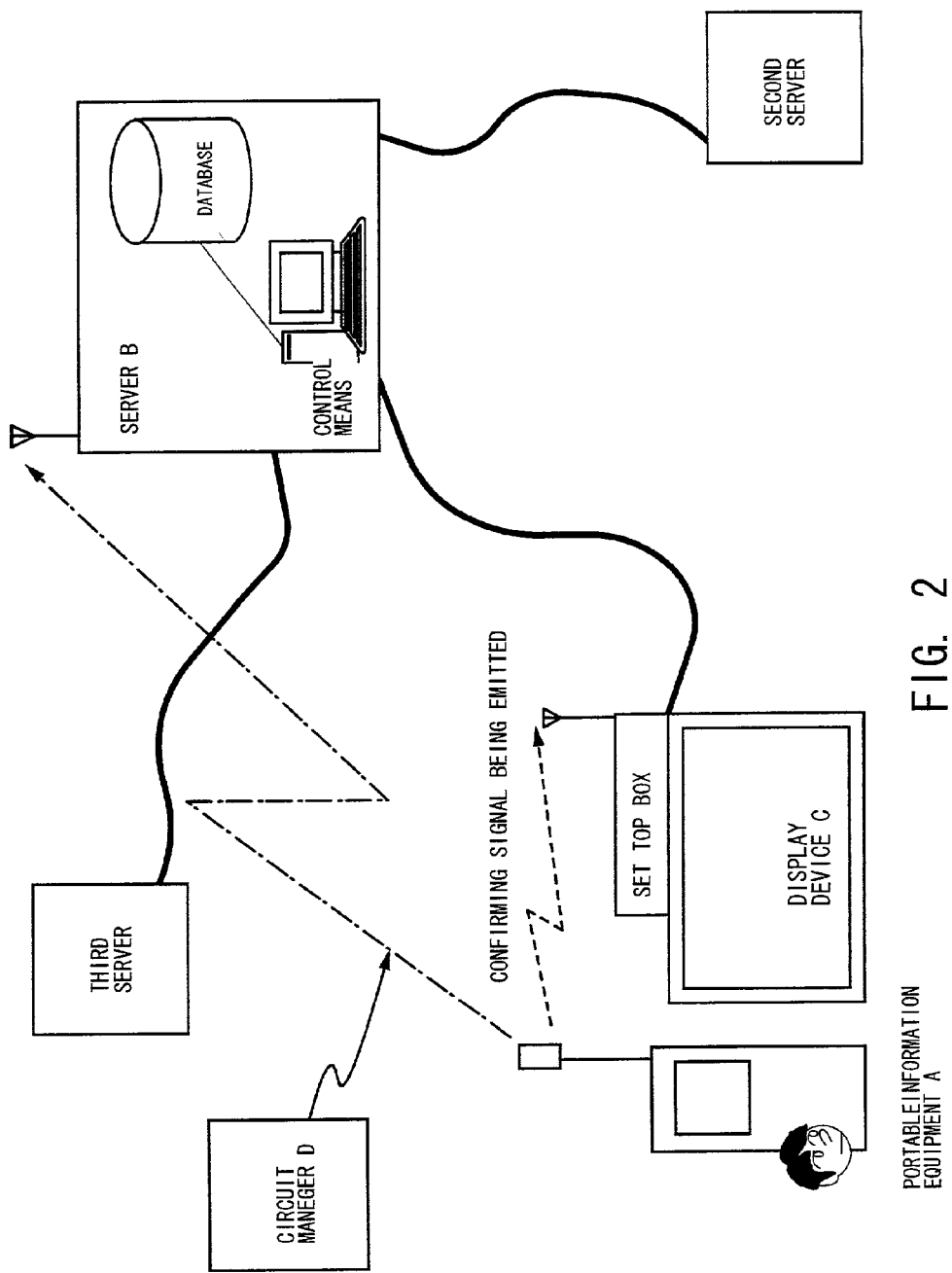
FIG. 2 is a diagram explaining the structure of the information providing system in accordance with the present invention.

Once the server B verifies the requirements for searching for and transmitting information, it then transmits information on an information provision menu screen to the display device C (FIG. 1 server B (2)). The display device C displays the menu (FIG. 1 display device C (2)) thereon, and transmits the search signal from the portable information equipment to the server B (FIG. 1 PORTABLE INFORMATION EQUIPMENT A (2)(3)).

Based on the search signal, the server B conducts a search on the database and transmits information produced by the search to the display device C (FIG. 1 server B (3)). The display device C then displays the transmitted information (Fig. DISPLAY DEVICE C (3)(4)).

When it is desirable to obtain more detailed or specific information than the information displayed on the display device C, a search signal is transmitted from the portable information equipment A to the server B (FIG. 1 Portable information equipment A (4)(5)).

The search signal can be transmitted continuously from the portable information equipment A to the server B until the selected information is displayed, and the information can be displayed on the display device C.

Note that, however, communication with other different servers (such as a second server, a third server, ad infinitum) is possible, as shown in FIG. 2. If information matching the search signal is not found by a search at server B, then the search signal transmitted from the portable information equipment A can be transmitted to the second server which is different from the server B. In this case, the search is conducted at a database managed by the second server. Information can then be transmitted to the display device C from the second server via the server B.

The server B applies a charge in exchange for performing the provision of information. Methods for applying the charge can include such various methods as: (1) known charging methods (such as obtaining consent in advance before applying the charge by providing information, such as is used in DialQ2 service of NTT); (2) configuring the system so that everything before the menu screen is conducted free of charge, and then the charge is applied once the information provision has begun on the basis of the amount of information provided or on the basis of the duration of time or number of pages required to provide the information; and (3) once the provision of all of the information has been completed, the party receiving the information determines the value of the information and pays accordingly.

The server B may use a party D (for example, NTT) that manages communication lines in order to apply the charge to the portable information equipment A.

Embodiment 2

Description will be made of a method for a server B to receive a search signal from a portable information equipment A, to conduct a search on a database, and to display information on a display device C through a line capable of delivering information with large amounts of data (for example, optical fibers, and high-speed data transmission line such as wiring for transmission for digital broadcast). Note that, in this embodiment, a portable telephone is used as the portable information instrument A.

Figure 5:
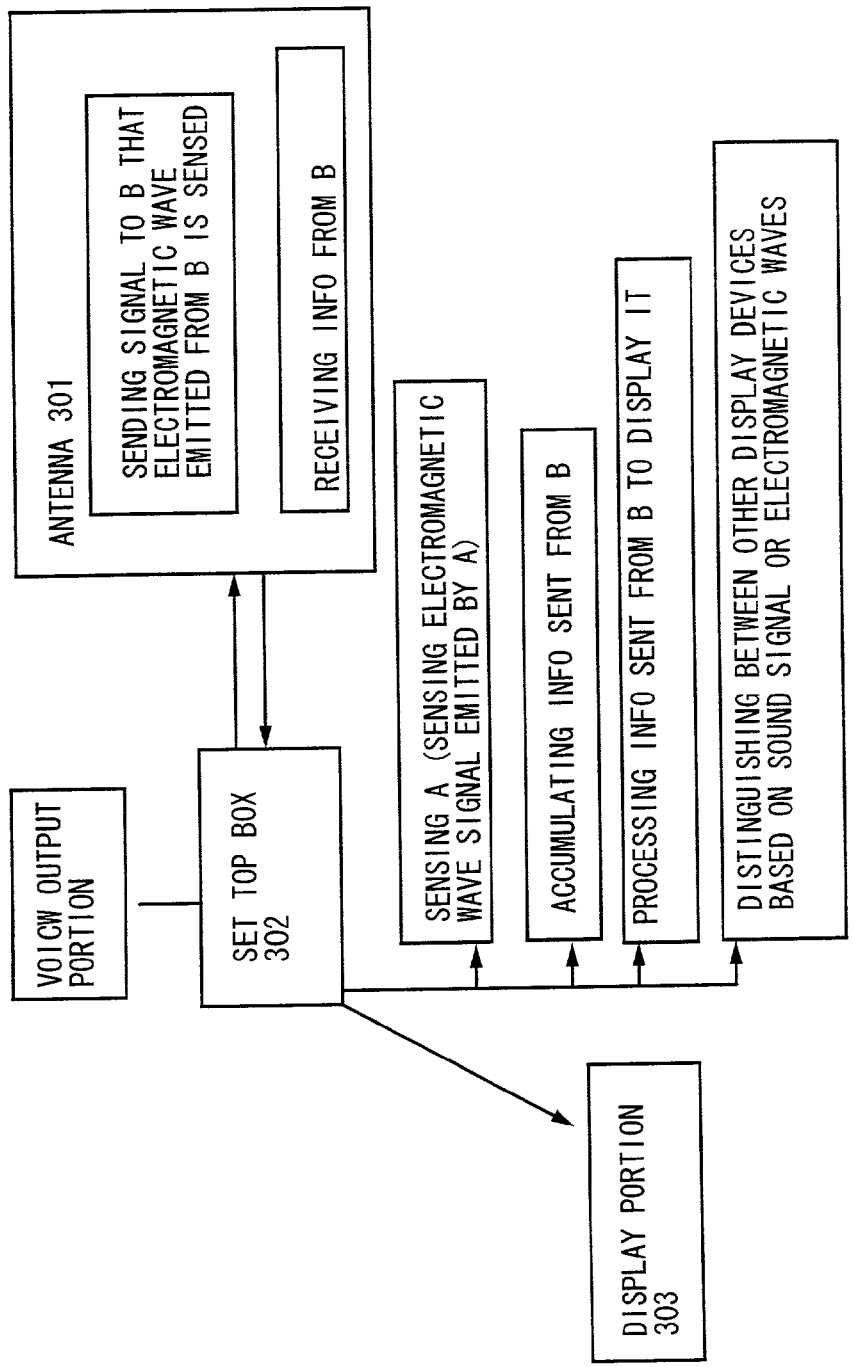
FIG. 5 is a diagram showing the structure of a display device.

As shown in FIG. 5, a set top box 302 for processing information sent from the server B is provided to the display device C.

Figure 3:
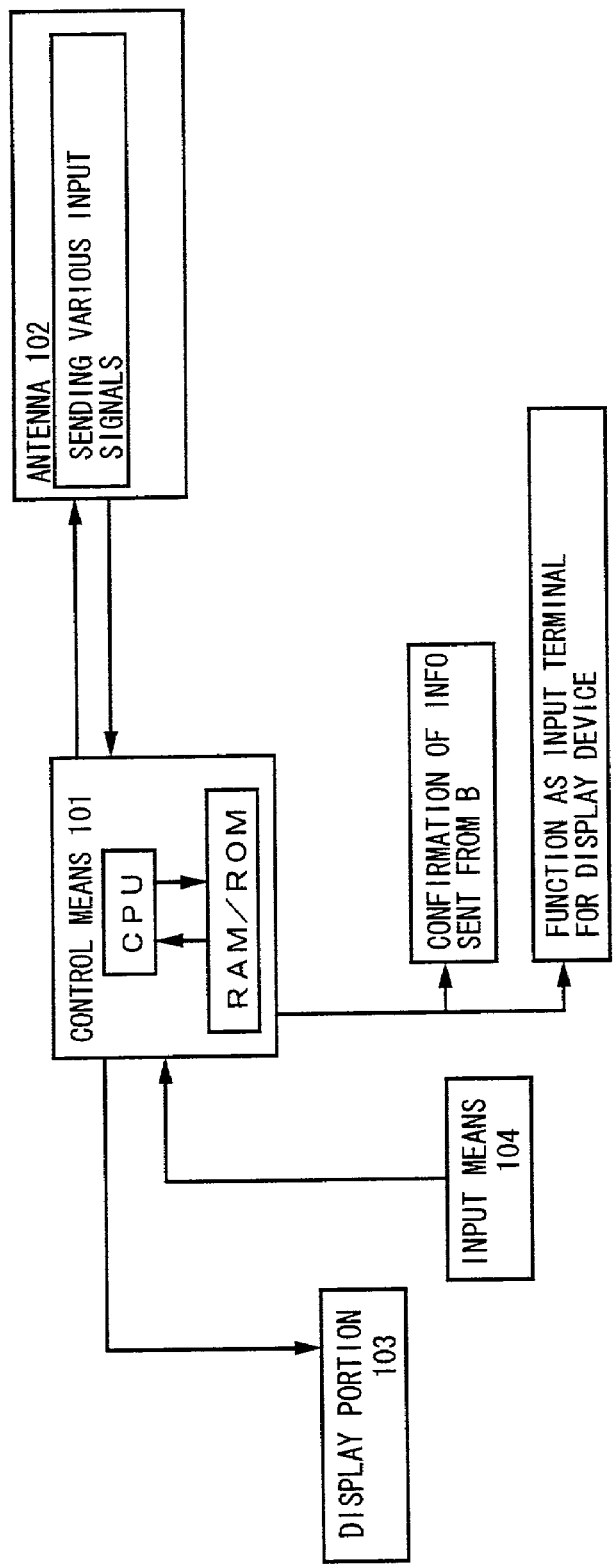
FIG. 3 is a diagram showing the structure of a portable information equipment.

For example, in the case where information regarding professional baseball/team xx is desired, a user connects to the server B through a special telephone number for information provision. Verification is performed on a display portion 103 of a portable telephone as shown in FIG. 3, while a push button (input means) 104 is used for inputting. The result is that an entity identification code assigned to the display device C which the user wants to output the information is transmitted.

Figure 4:
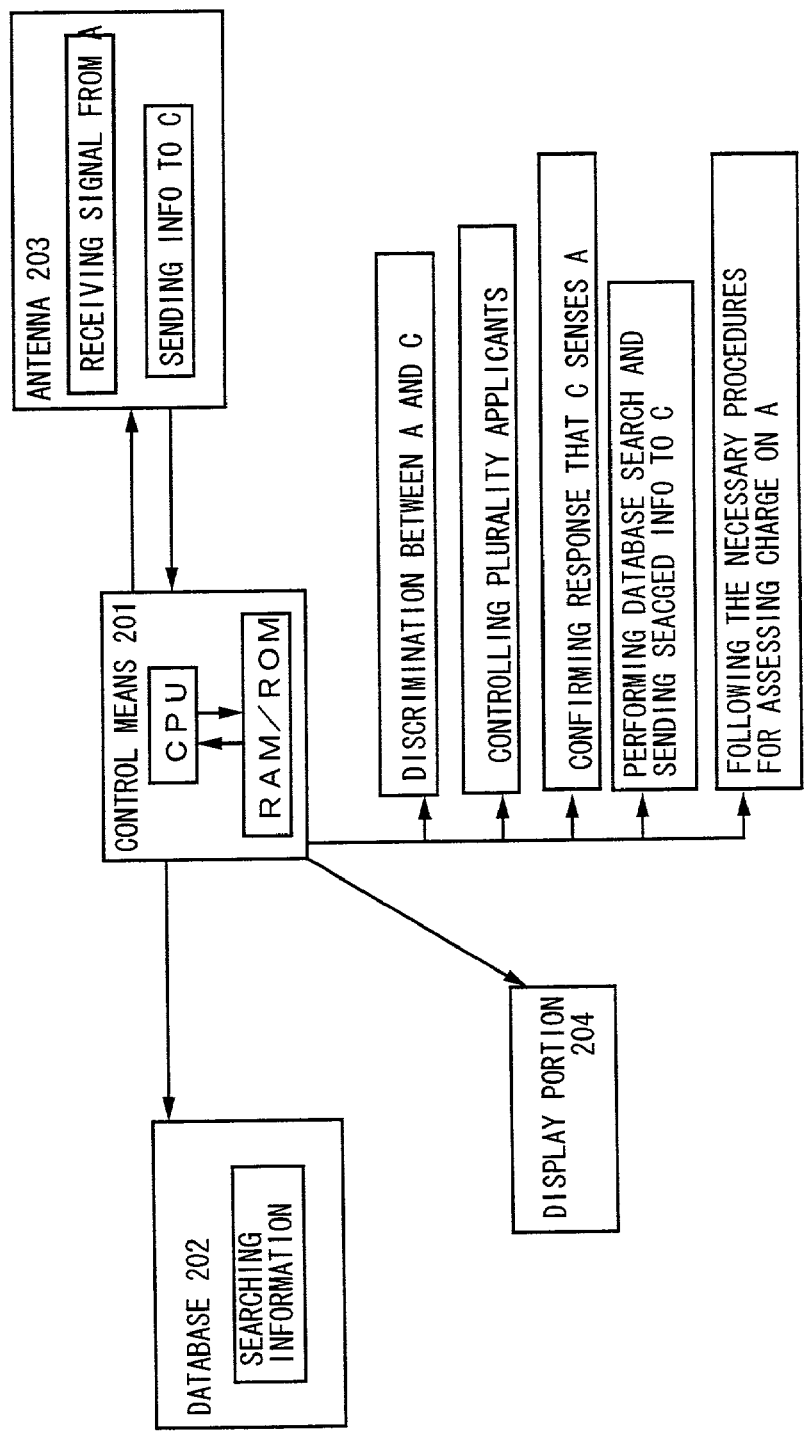
FIG. 4 is a diagram showing the structure of a server.

In the server B shown in FIG. 4, a control means 201 performs entity identification of the portable telephone A and entity identification of the display device C according to a signal of the portable telephone A which has accessed to a special telephone number. When verification has been made, information is transmitted so that a menu screen is displayed on a display portion 303 of the display device C.

While looking at the menu screen displayed on the display portion 303 of the display device C, the user uses the push button 104 of the portable telephone A to input and send the search signal to the server B such that the information regarding professional baseball/team xx is transmitted.

Having received the search signal, the server B conducts the search on the database 202 and sends the information regarding professional baseball/team xx to the display device C. The display device C processes the information transmitted through the set top box 302 and displays the information in the display portion 303.

Note that, however, information transmission from the server B to the display device C is complete upon display of the information on the display device C.

From the information regarding professional baseball/team xx displayed on the display device C, it is also possible to transmit a search signal further specifying the information, for example, the information regarding professional baseball/team xx/player yy, to the server.

Transmission of the search signal from the portable information equipment A is repeated to produce the result that detailed information saved in the database regarding professional baseball/team xx/player xx is displayed on the display portion 303 of the display device C.

Further, it is also possible to configure the method so that the portable telephone A can be used to change the image display conditions of the display device C (brightness, contrast, and tone) and the input language settings. In this way, the information is displayed according to user's own preferred screen display style and in the user's competent language.

There is a possibility of a problem occurring in the case where the information is not displayed accurately in the display portion 303 of the display device C, and yet the charge is applied even though the information has not been provided. In order to prevent this type of situation, it is desirable to create rules in advance such as: in the case that the information has not been displayed on the display device C, an information stating that the information has not been displayed is transmitted from the portable information equipment A to the server B via a known means such as electronic mail. In this case, the server B sends the information again.

The server applies the charge in the case that the information provision was carried out without an error. There are various imaginable methods for applying the charge, as shown in the first embodiment.

Note that, however, in the case that there are a plurality of requests for information provision, a sequence for carrying out the information provision is mediated by the server B, and then the information provision is carried out.

Embodiment 3

In the case where only normal telephone lines are connected to the display device, time is required until the information sent from the server is displayed on the display device C. Therefore, as an example of sending and receiving the information, it is possible to use a communication satellite in a supplementary fashion for sending and receiving the information by radio.

The search signal is sent from the portable information equipment A to the server B, and the server B conducts the search on a database 202.

From multiple sets of information of the search on the database 202, information consisting of small amounts of data is sent to the display device C using telephone lines. Information consisting of large amounts of data is sent from the server B to the display device C using the communication satellite.

Information sent through either method is processed by the set top box 302 connected to the display device C and displayed on the display portion 303 of the display device C. In order to obtain more specific information, a search signal is sent from the portable information equipment A to the server B and the search is repeated, with the result that the information is displayed on the display portion 303 of the display device C.

In this embodiment, a communication satellite was used as means for supplementing sending of the information, however, it is possible to use a transmission relay means other than the communication satellite.

Embodiment 4

It is possible to configure the method so that information for commercial advertising of profit-making activities for broadly informing people of merchandise and services (referred to throughout this specification as commercial advertising) and advertising by non-profit organizations relating to morality, welfare, etc. (referred to throughout this specification as public service announcements) can be sent from the server B to the display device C when a search signal is sent from the portable information equipment for a predetermined period of time. This information provision system can be used for utilizing the display device C as an advertising medium.

For example, a person wanting to publicize his or her own store (hereinafter, referred to as a publicity client) enters a contract with the server B to use the information providing system of the present invention for publicity. The contract indicates, for example, that the information providing system is used in order to display publicity information stored (accumulated) on the server B on the display device C at periods of time when many people will view the display device C (high publicity effect time periods). The publicity client can be charged for "storing information for publicity activities" and for "displaying advertisements (information)". Also, the fees can be adjusted according to the period of time during which the information is displayed. Since the information to be displayed on the display device C is stored in the server B in advance, there is no need for the publicity client to request for information display from the portable information equipment. In this way, the system can be used effectively even when not being used as the information providing system (i.e., times when a search signal is not sent).

Additionally, in the case when there are multiple requests to display information (publicity), the system can be configured so that the server B mediates and performs the publicity activities of the multiple publicity clients in sequence.

Embodiment 5

It is also possible to register the entity identification ID number, etc. of a display device C mounted on means for carrying and transporting people or on means for transportation (for example, bus, taxi, train, boat, etc.) and to send the information from the server B to be displayed on the display portion 303.

In order to display the information on the display portion 303 of the display device C, it is sufficient that the portable information equipment A is used as an input terminal and the search signal is sent to the server B. It is sufficient if the server B conducts the search on the database 202, sends the information of the search to the display device C, and displays the information on the display portion 303 of the display device.

It is possible to use the display device C shown in this embodiment as the information providing system cited in Embodiments 1 to 4 of the invention, or as a publicity medium for displaying publicity information.

Embodiment 6

The portable information equipment A sends electromagnetic waves at times other than when communicating. A method for undertaking publicity activities of the information providing system itself using a display device C having means for detecting the electromagnetic waves sent by the portable information equipment A is explained.

The display device C can be configured to display an explanatory overview of the information provision system (how information can be received, what kinds of information can be received, etc.) or to send a call from the voice output portion, etc when the above-mentioned electromagnetic waves sent by the portable display device A are detected.

Information for explaining the information providing system can be stored on the server B, then sent to the display device C and displayed. The information may also be stored in the set top box 302 mounted on the display device C.

In this way, the display device C can be used as a publicity medium for increasing usage of the information providing system of the present invention, and for conducting publicity activities for the information providing system itself.

Embodiment 7

The display portion of the display device C is large and when the display device C is used to display only a single piece of information, a large portion of the display is wasted. Therefore, the system can be used to conduct multiple flows of information provision simultaneously (i.e., procedures of sending the search signal from the portable information equipment A, and the server B conducting the search on the database). In this case, multiple sets of information are sent from the server B to the display device C, the display portion of the display device C is divided into multiple regions, and the different multiple sets of information sent from the server B are displayed simultaneously.

Also, it is possible to display multiple sets of information sent from the server B in an overlapping fashion in the display portion.

Note that, however, it is possible to use any of Embodiments 1 to 6 in combination with the present embodiment.

Embodiment 8

At specified times, the server B does not send the information of the search in the database based on the search signal sent from the portable information equipment A to the display device C but may designate a specific broadcasting company and configure the system so as to display information delivered by this news agency, newspaper company or broadcasting company as it is. Also, the signal for displaying the delivered information does not have to be sent from the server B to the display device C. Further, the signal for displaying the delivered information from the server B does not have to be sent to the display device C, and the set top box mounted on the display device C may be set to display the delivered information.

Note that, it is not only possible to display the delivered information at pre-programmed times but also to display the information sent out from the broadcasting company as it is by the server B operating the system (i.e., send a signal). The broadcasting company can be a private-sector broadcasting company (also referred to as a commercial broadcasting company) or a public broadcasting agency, and the delivered information can be the content that is generally delivered. It is possible to display delivered information including news regarding current events delivered by news agencies and newspaper companies.

By combining this embodiment with Embodiment 7, it becomes possible to display information produced in response to the search signal simultaneously with the display of the broadcast.

Note that, this embodiment can be used in combination with any of Embodiments 1 to 7.

The information providing system according to the present invention enables a search signal to be sent from a portable information equipment to a server, with the result that the server conducts a search for information, the information is sent from the server to a display device located where an unspecified number of the general public may be present, and the information is displayed on the display device having strong display capacities.

In contrast to the case in which the information is displayed on a small display screen of the portable information equipment, there no limitation on the size of the display screen. Furthermore, the display capacity of the image may be strengthened and more precise image information can be obtained on a large screen without making the user wait for a long time.

Additionally, it is not necessary to display information consisting of large amounts of data on the display portion of the portable information equipment. Therefore, reduction of electricity consumption is encouraged, and the portable information equipment itself can be made smaller and lighter in weight to the extent the size of its power source becomes smaller.

Also, by using the portable information equipment, identification of the individual user of the information providing system becomes possible. Therefore, the supplier of the information provision can easily charge the individual using the information providing system, and the user of the information providing system can obtain information just as though he or she were manipulating a television by remote control in his or her own room.

What is claimed is:

1. An information providing system comprising:
    a first server for obtaining information from a database managed by a second server;
    a portable information equipment capable of two-way communication with the first server, the portable information equipment having a first display portion; and
    a display device for receiving information from the first server, the display device having a second display portion,
    wherein the portable information equipment sends an identification signal to the display device by an electromagnetic wave,
    wherein the portable information equipment sends an identification signal of the display device to the first server,
    wherein the portable information equipment sends a search signal to the first server,
    wherein the first server sends the search signal to the second server and conducts a search to the database managed by the second server based on the search signal, receives information obtained by the search from the second server, and sends the information to the display device,
    wherein the display device displays the information on the second display portion of the display device,
    wherein the display device is mounted on means for transportation, and
    wherein the display device has a unit for detecting the electromagnetic wave sent from the portable information equipment.

2. A system according to claim 1, wherein the means for transportation is one selected from the group consisting of a bus, a taxi, a train and a boat.

3. A system according to claim 1, wherein the electromagnetic wave is light or infrared rays.

4. An information providing method, comprising the steps of:
    sending an identification signal of a portable information equipment to a display device by an electromagnetic wave, the portable information equipment having a first display portion and the display device having a second display portion;

sending, by the portable information equipment, an identification signal of the display device and the identification signal of the portable information equipment to a first server;

verifying, by the first server, the identification signal of the display device and the identification signal of the portable information equipment;

sending, by the portable information equipment, a search signal to the first server;

communicating, by the first server, with a second server;

sending, by the first server, the search signal to the second server;

conducting a search on a database managed by the second server based on the search signal;

sending information obtained by the search from the second server to the first server;

sending the information from the first server to the display device; and displaying, by the display device, the information on the second display portion of the display device, wherein the display device is mounted on means for transportation, and wherein the display device has a unit for detecting the electromagnetic wave sent from the portable information equipment.

5. A method according to claim 4, wherein the display device is disposed at a place that can he seen by an unspecified number of the general public.

6. A method according to claim 4, further comprising a step of:

receiving, by the display device, the information sent from the first server through a line.

7. A method according to claim 4, further comprising a step of:

receiving, by the display device, information sent from the first server via a satellite.

8. A method according to claim 4, further comprising a step of:

displaying, by the display device, information selected from information delivered by a news agency, a newspaper publishing company or a broadcasting station.

9. A method according to claim 8, further comprising a step of:

displaying, by the display device, on the same screen the delivered information and the information obtained by the search on the database, for a programmed period of time or at a time when the server performs an operation.

10. A method according to claim 4, wherein the means for transportation is one selected from the group consisting of a bus, a taxi, a train and a boat.

11. A method according to claim 4, wherein the electromagnetic wave is light or infrared rays.

12. An information providing system comprising:

a first server for obtaining information from a database managed by a second server;

a portable information equipment capable of two-way communication with the first server, the portable information equipment having a first display portion; and a display device for receiving information from the first server, the display device having a second display portion, wherein the portable information equipment sends an identification signal to the display device by an electromagnetic wave, wherein a response of the display device to detecting the electromagnetic wave sent from the portable information equipment is transmitted to the first server, wherein the portable information equipment sends an identification signal of the display device to the first server, wherein the portable information equipment sends a search signal to the first server, wherein the first server sends the search signal to the second server to cause the second server to conduct a search to the database managed by the second server based on the search signal, receives information obtained by the search from the second server, and sends the information to the display device, wherein the display device displays the information on the second display portion of the display device, wherein the display device is mounted on means for transportation, and wherein the display device has a unit for detecting the electromagnetic wave sent from the portable information equipment.

13. A system according to claim 12, wherein the electromagnetic wave is light or infrared rays.

14. An information providing method, comprising the steps of:

sending an identification signal of a portable information equipment to a display device by an electromagnetic wave, wherein the portable information equipment has a first display portion and the display device has a second display portion, and wherein a response of the display device to detecting the electromagnetic wave sent from the portable information equipment is transmitted to a first server, sending, by the portable information equipment, an identification signal of the display device and the identification signal of the portable information equipment to the first server;

verifying, by the first server, the identification signal of the display device and the identification signal of the portable information equipment;

sending, by the portable information equipment, a search signal to the first server communicating, by the first server, with a second server;

sending, by the first server, the search signal to the second server;

conducting a search on a database managed by the second server based on the search signal;

sending information obtained by the search from the second server to the first server;

sending the information from the first server to the display device; and displaying, by the display device, the information on the second display portion of the display device, wherein the display device is mounted on-means for transportation, and wherein the display device has a unit for detecting the electromagnetic wave sent from the portable information equipment.

15. A method according to claim 14, wherein the electromagnetic wave is light or infrared rays.

* * * * *